US012701082B2

(12) United States Patent
Kumar et al.

(10) Patent No.: US 12,701,082 B2
(45) Date of Patent: Aug. 4, 2026

(54) SYSTEMS AND METHODS FOR SUPPORTING EVENT-BASED DEMAND IN A PRIVATE NETWORK

(71) Applicant: Verizon Patent and Licensing Inc., Basking Ridge, NJ (US)

(72) Inventors: Abhishek Kumar, Irving, TX (US); Ravi Potluri, Coppell, TX (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 54 days.

(21) Appl. No.: 18/808,444

(22) Filed: Aug. 19, 2024

(65) Prior Publication Data

US 2026/0052102 A1     Feb. 19, 2026

(51) Int. Cl.
*H04L 47/125*         (2022.01)
*H04L 9/40*           (2022.01)
*H04L 47/2441*        (2022.01)

(52) U.S. Cl.
CPC ........ *H04L 47/125* (2013.01); *H04L 47/2441* (2013.01); *H04L 63/104* (2013.01)

(58) Field of Classification Search
CPC ... H04L 41/06; H04L 41/0668; H04L 47/125;

H04L 47/2441; H04L 63/104; H04L 67/1004; H04L 67/1008; H04L 67/1034; H04L 67/562; H04W 28/084; H04W 8/00

See application file for complete search history.

(56) References Cited

U.S. PATENT DOCUMENTS

| | | | | |
|---|---|---|---|---|
| 10,785,652 | B1 * | 9/2020 | Ravindranath | ....... H04W 12/48 |
| 11,863,465 | B1 * | 1/2024 | Nijim | .................... H04L 47/805 |
| 2021/0336889 | A1 * | 10/2021 | Yaswi | ................. H04L 41/0895 |
| 2022/0095089 | A1 * | 3/2022 | Odini | ..................... G06N 20/00 |
| 2023/0060623 | A1 * | 3/2023 | Wang | ...................... H04L 41/16 |
| 2023/0068386 | A1 * | 3/2023 | Akdeniz | ................ G06N 3/084 |
| 2024/0056495 | A1 * | 2/2024 | Abougamia | ........ H04L 67/1008 |
| 2024/0064106 | A1 * | 2/2024 | Schiocchet | ............ H04L 41/16 |

* cited by examiner

*Primary Examiner* — Christopher Biagini

(57) ABSTRACT

A device may detect events associated with users of a public network and a private network, and may process the events, with a first machine learning model, to define the events and assign priorities to the events to generate prioritized events. The device may process the prioritized events and policies associated with the private network and the public network, based on the priorities and with a second machine learning model, to determine actions to perform in the private network and the public network. The device may cause resources to be allocated in the private network and the public network for performance of the actions.

20 Claims, 11 Drawing Sheets

100 ⟶

115
Detect events associated with users of a public network and a private network

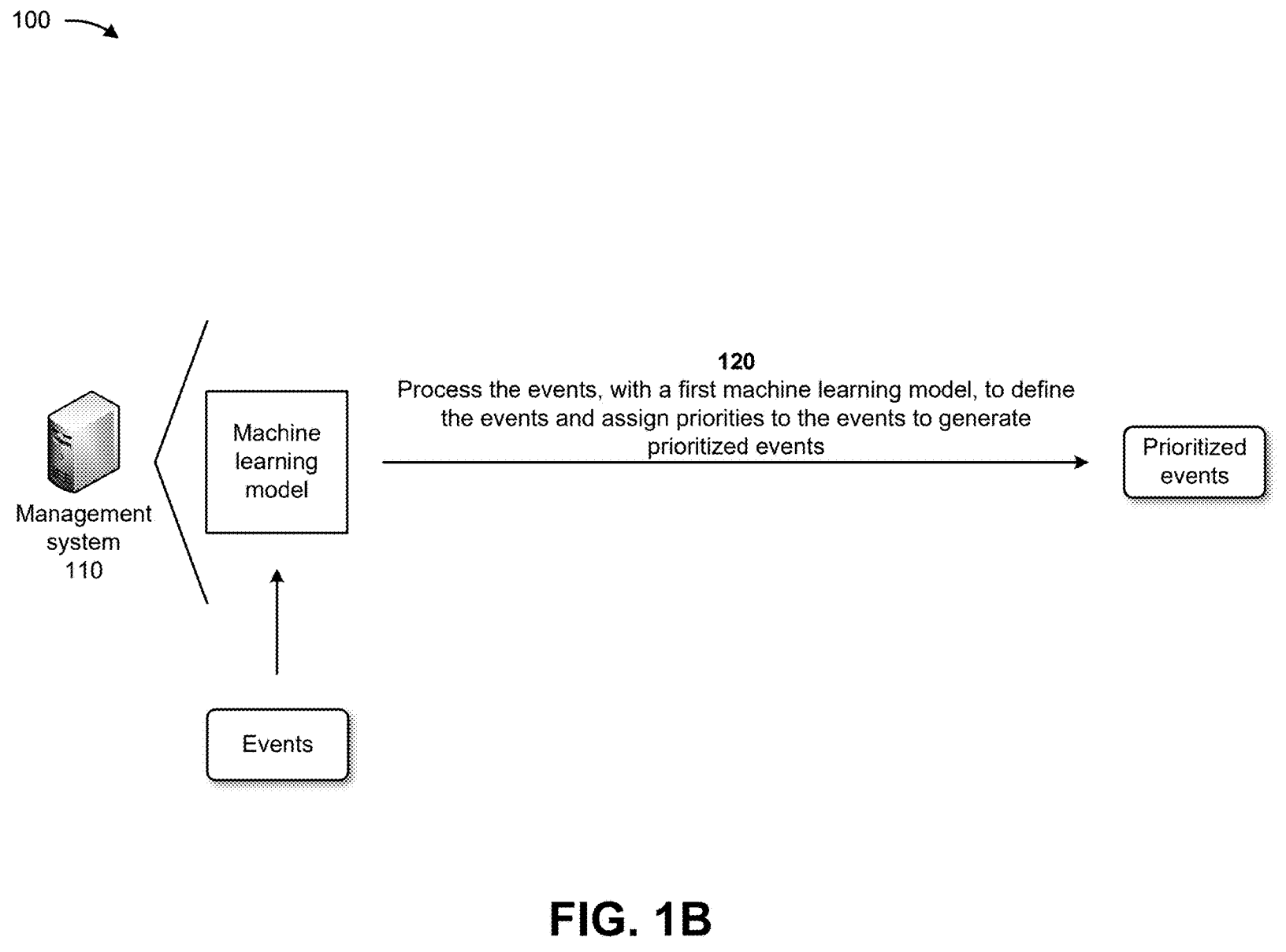

100

Prioritized events

120
Process the events, with a first machine learning model, to define the events and assign priorities to the events to generate prioritized events Machine learning model Events Management system
110

FIG. 1B

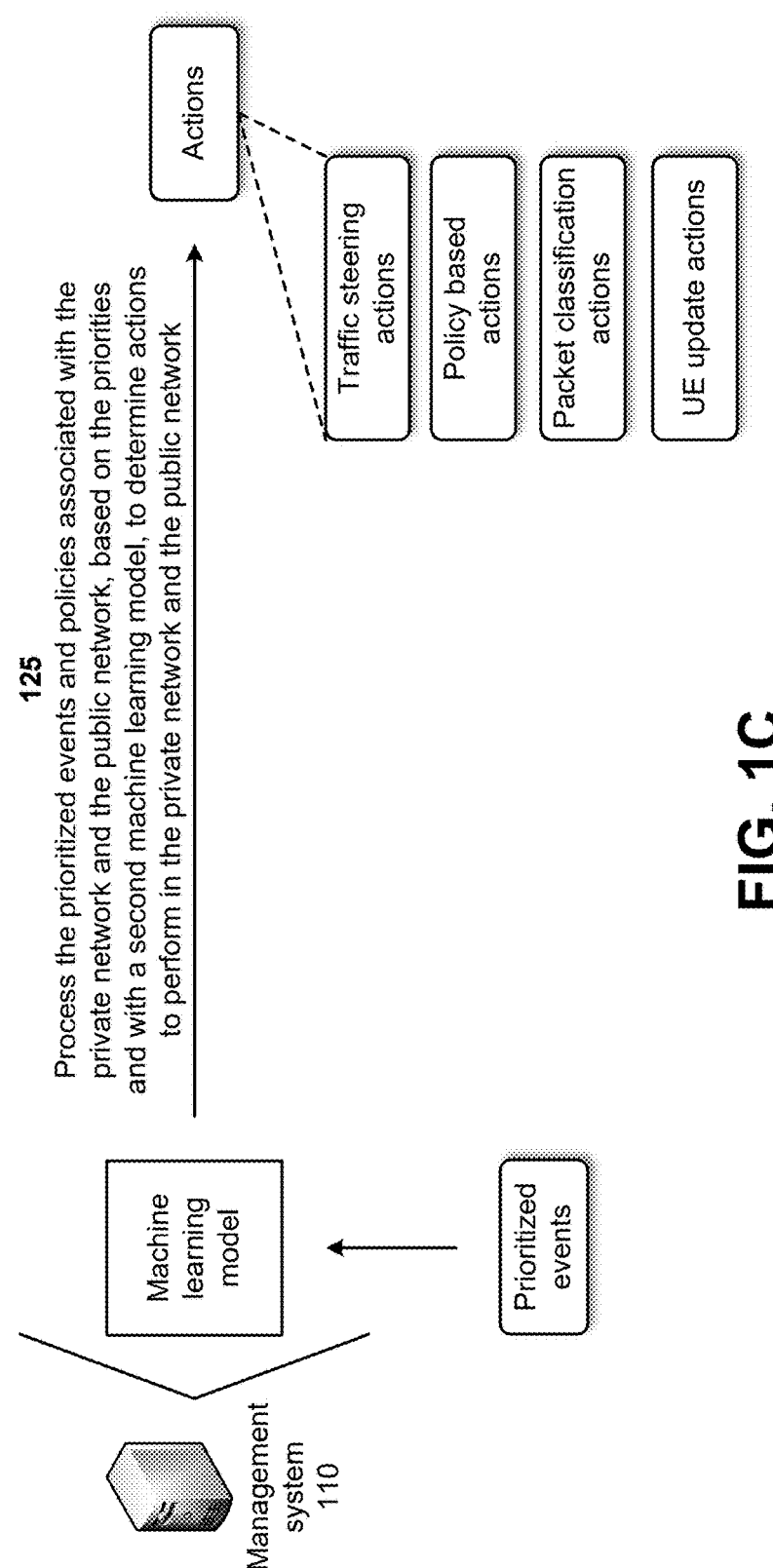

125

Process the prioritized events and policies associated with the private network and the public network, based on the priorities and with a second machine learning model, to determine actions to perform in the private network and the public network Actions Traffic steering actions Policy based actions Packet classification actions UE update actions Machine learning model Management system 110

Prioritized events

140
Update the first and second machine learning models based on the feedback and to generate updated first and second machine learning models

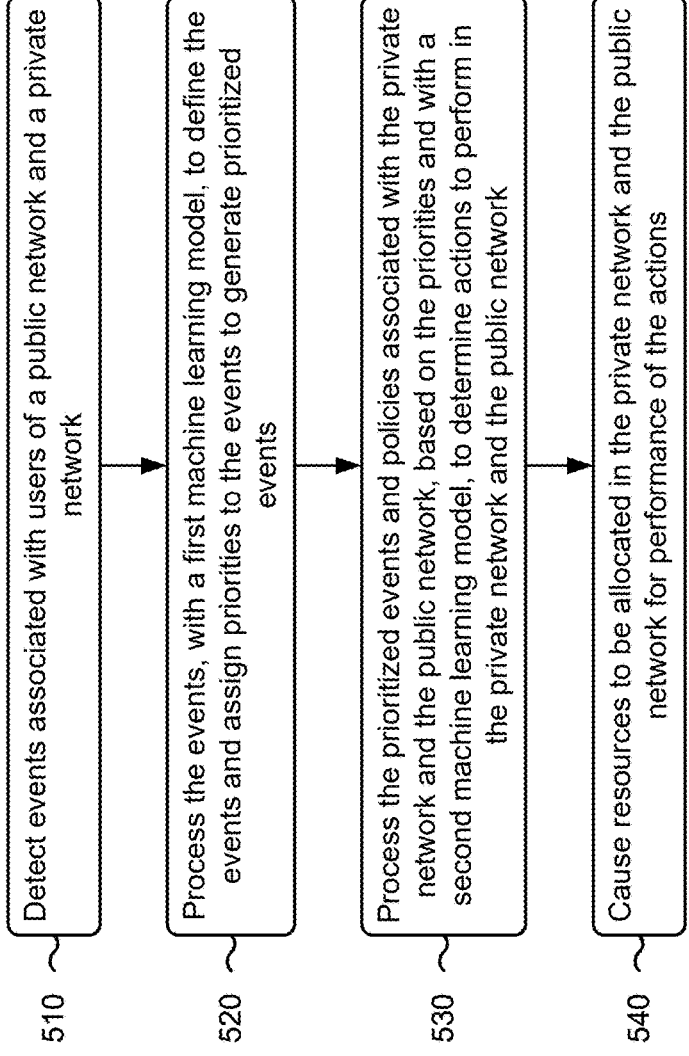

510 — Detect events associated with users of a public network and a private network 520 — Process the events, with a first machine learning model, to define the events and assign priorities to the events to generate prioritized events 530 — Process the prioritized events and policies associated with the private network and the public network, based on the priorities and with a second machine learning model, to determine actions to perform in the private network and the public network 540 — Cause resources to be allocated in the private network and the public network for performance of the actions

SYSTEMS AND METHODS FOR SUPPORTING EVENT-BASED DEMAND IN A PRIVATE NETWORK

BACKGROUND

In the realm of mobile network communication, the provisioning and management of network capacity to meet user demand is an ongoing challenge. This challenge grows increasingly complex in the context of private networks, such as those servicing enterprises, hospitals, airports, and similar environments.

BRIEF DESCRIPTION OF THE DRAWINGS

FIGS. 1A-1G are diagrams of an example associated with supporting event-based demand in a private network.

FIG. 5 is a flowchart of an example process for supporting event-based demand in a private network.

DETAILED DESCRIPTION OF EXAMPLE EMBODIMENTS

Figure 1A:
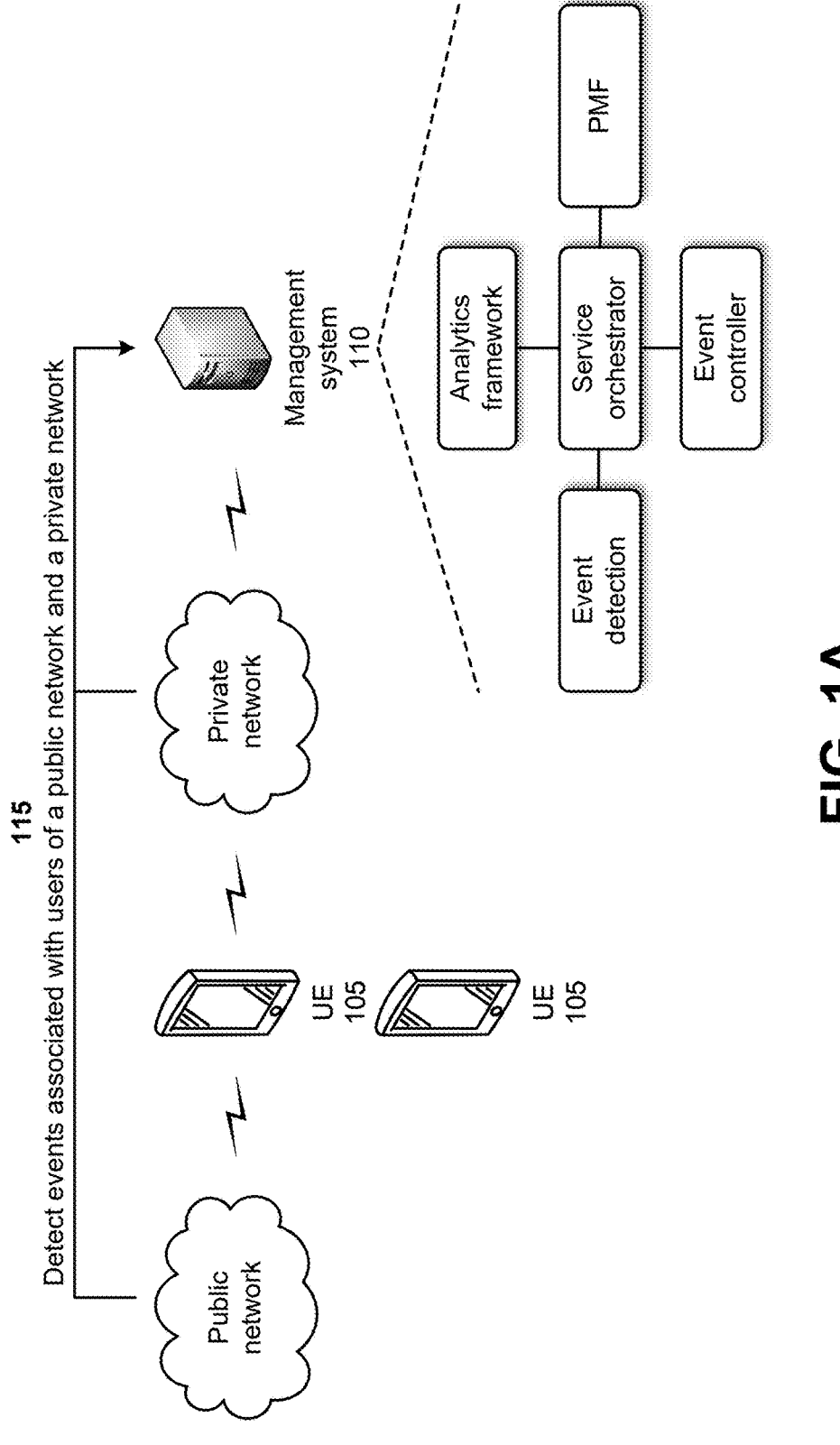

The following detailed description of example implementations refers to the accompanying drawings. The same reference numbers in different drawings may identify the same or similar elements.

Private networks must cater to varied user groups, including employees, customers, and privileged users, each with their own unique connectivity requirements and service level agreements (SLAs). Moreover, these different user groups may cause unpredictable surges in network demand (e.g., often event driven) that can strain both private and public network resources. However, traditional network management methods struggle to effectively anticipate and address transient, localized surges in demand often triggered by events. Current issues stem from the difficulty in differentiating and managing the diverse user mix on private networks, where each user group may have distinct service expectations and entitlements. Additionally, challenges arise from a need to rapidly scale up or down a private network infrastructure in response to fluctuations in demand while maintaining alignment with pre-existing SLAs and policies. Thus, current techniques for handling event-based demand in a private network consume computing resources (e.g., processing resources, memory resources, communication resources, and/or the like), networking resources, and/or other resources associated with failing to properly manage a diverse user mix on private networks, handling congestion in private networks due to failing to properly manage the diverse user mix, failing to rapidly scale up or down a private network infrastructure in response to fluctuations in demand while maintaining alignment with pre-existing SLAs and policies, and/or the like.

Some implementations described herein relate to a management system that supports event-based demand in a private network. For example, the management system may detect events associated with users of a public network and a private network, and may process the events, with a first machine learning model, to define the events and assign priorities to the events to generate prioritized events. The management system may process the prioritized events and policies associated with the private network and the public network, based on the priorities and with a second machine learning model, to determine actions to perform in the private network and the public network. The management system may cause resources to be allocated in the private network and the public network for performance of the actions.

In this way, the management system supports event-based demand in a private network. For example, the management system may dynamically orchestrate network resources to perform actions in response to event-based demand in private network environments. The management system may conserve network resources through strategic traffic steering and load balancing that dynamically adjust to real-time fluctuations in network demand, and may preserve network integrity and reduce unnecessary bandwidth consumption. The management system may receive feedback associated with performance of the actions, which may facilitate continuous updating and refining of the management system for an evolving network management strategy. Thus, the management system may conserve computing resources, networking resources, and/or other resources that would have otherwise been consumed by failing to properly manage a diverse user mix on private networks, handling congestion in private networks due to failing to properly manage the diverse user mix, failing to rapidly scale up or down a private network infrastructure in response to fluctuations in demand while maintaining alignment with pre-existing SLAs and policies, and/or the like.

FIGS. 1A-1G are diagrams of an example 100 associated with supporting event-based demand in a private network. As shown in FIGS. 1A-1G, example 100 includes user equipments (UEs) 105 associated with a public network, a private network, and a management system 110. Further details of the UE 105, the public network, the private network, and the management system 110 are provided elsewhere herein.

As shown in FIG. 1A, the management system 110 may include a service orchestrator component, an event detection component, an event controller component, an analytics framework component, and a performance management function (PMF). The service orchestrator component may include a cloud native (e.g., provided in a cloud environment provided by the private network) orchestrator that manages network elements provided in the private network (e.g., fifth-generation (5G) network elements). For example, the service orchestrator component may administer various policies to efficiently manage traffic load in the private network and/or the public network, such as rate limiting sessions to efficiently regulate traffic flowing through the private network and the public network and prevent congestion, identifying a traffic trend in the private network or the public network, deflecting the traffic from private network to the public network or vice versa, and/or the like.

The event detection component may include an application that detects events associated with the private network and the public network in near-real-time. The event controller component may include an application that controls handling of the events (e.g., detected by the event detections component) by the service orchestrator component in near-real-time.

The analytics framework component may include one or more machine learning models that determine corrective actions to be performed by resources of the private network and/or the public network based on pre-configured rules and/or policies corresponding to particular types of events. The PMF may include an application controller that gathers telemetry statistics (e.g., key performance indicators (KPIs), traffic load, and/or the like) from the network elements of the private network and provides the telemetry statistics to the analytics framework component (e.g., for training the one or more machine learning models).

As further shown in FIG. 1A, and by reference number 115, the management system 110 may detect events associated with users of a public network and a private network. For example, the users may utilize the UEs 105 to access the public network and/or the private network. The users may include different categories associated with accessing with the public network and the private network, such as first category of users that may only access the public network, a second category of users that may only access the private network, and a third category of users that may access the public network and the private network. As the UEs 105 access the private network, a traffic load on the private network may fluctuate and may generate events associated with the public network and the private network.

The events may include the traffic associated with the private network exceeding a threshold level, the traffic associated with the public network exceeding a threshold level, a bandwidth of the private network nearing capacity, a bandwidth of the public network nearing capacity, a policy violation associated with the private network, a policy violation associated with the public network, an SLA violation associated with the private network, an SLA violation associated with the public network, non-essential traffic associated with the private network, non-essential traffic associated with the public network, network performance metrics associated with the private network failing to satisfy a threshold, network performance metrics associated with the public network failing to satisfy a threshold, and/or the like.

The management system 110 may monitor activities within the private network and the public network (e.g., with the event detection component), and may determine whether the activities constitute events. The management system 110 may utilize one or more machine learning models to analyze the activities, and to identify events (e.g., activities that cause a surge in demand for network resources of the private network and/or the public network) based on the activities. The events may occur in localized geographic regions and may be transient in nature, corresponding to occurrences that could be categorized into events affecting the public network or those specific to the private network. The management system 110 may detect the events in real-time or near real-time, as rapid responsiveness may be necessary to address the dynamics of network demand.

In some implementations, the management system 110 may utilize one or models, such as neural network models, generative adversarial networks (GANs) for anomaly detection, and/or clustering models for template selection, to effectively detect events. Additionally, or alternatively, the management system 110 may utilize a variety of data sources, such as sensors or network traffic logs, to detect events causing a surge in network demand. This may provide a more comprehensive data analysis and the potential for detecting a wider range of events more effectively. Furthermore, different models, such as decision trees or support vector machines, may be utilized by the management system 110 for more effective event detection. These alternative models may offer different strengths in data analysis and pattern recognition that could be utilized according to a specific network context. Moreover, the management system 110 may use other parameters like geographic location, time of day, and historical data patterns to anticipate and detect events. Access to such diverse parameters may enable the management system 110 to provide better predictions for future events and allowing for more proactive management strategies.

As shown in FIG. 1B, and by reference number 120, the management system 110 may process the events, with a first machine learning model, to define or classify the events and assign priorities to the events to generate prioritized events. For example, the management system 110 may utilize one or models, such as neural network models, GANs for anomaly detection, and/or clustering models for template selection, to effectively classify the events. Furthermore, different models, such as decision trees or support vector machines, may be utilized by the management system 110 for more effective event classification. The management system 110 may categorize the events into a broader range of classifications, such as scheduled and unscheduled events, to facilitate more nuanced network management strategies. Being able to distinguish between events that are predictable versus events that are unexpected may enable the management system 110 to proactively optimize network resource allocation and readiness, thereby enhancing the overall resilience and responsiveness of the private network and/or the public network to varying needs.

In some implementations, the management system 110 may define the events by categorizing the events based on the different user categories associated accessing with the public network and the private network. This may enable the management system 110 to align the events with the distinct service requirements and network access privileges of different user categories, thereby ensuring that prioritization is sensitive to the unique operational contexts of each user category. Additionally, or alternatively, event classification may include the management system 110 determining if an event is normal day-to-day variation or an anomaly requiring immediate attention, thereby adjusting prioritization accordingly. Distinguishing between routine fluctuations and significant anomalies may help the management system 110 to assign priorities to the events based on relative impact on network operation.

The management system 110 may utilize one or models, such as neural network models, GANs for anomaly detection, and/or clustering models for template selection, to effectively assign priorities to the events and to generate the prioritized events. Furthermore, different models, such as decision trees or support vector machines, may be utilized by the management system 110 for more effective assignment of priorities to the events. In some implementations, the management system 110 may assign the priorities to the events based on the classifications defined for the events. The management system 110 may determine the priorities assigned to events based on factors, such as types of user activities, network load, specific times of day when network usage is at its peak, and/or the like. Thus, the management system 110 may assign priorities to the events that reflect actual network conditions and user demands, ensuring that critical events are handled with urgency. Additionally, or alternatively, the management system 110 may correlate the events with corresponding policies associated with the private network to further define the priorities assigned to the events. This may ensure that the event classifications and the ensuing priorities are aligned with governance frameworks and policy stipulations, thereby supporting a compliant and standardized approach to event management.

In some implementations, the management system 110 may utilize historical event definitions and event occurrences to train the machine learning models used to define the events and to assign the priorities to the events. The historical event definitions and event occurrences may include data associated with the public network in addition to the private network. This broader data set may provide historical patterns and definitions that can be used to fine-tune the machine learning models, thus increasing predictive accuracy and operational efficiency.

Additionally, or alternatively, prioritization of the events may be dynamic by adapting to real-time network conditions and user behavior patterns and adjusting the priorities assigned to the events. Such adaptability may ensure that the management system 110 remains responsive to the evolving network landscape, dynamically recalibrating event priorities in response to real-time data and feedback. To prioritize network efficiency and service quality, the management system 110 may prioritize the events based on impacts of the events on network performance and user experience, focusing resources management system 110 on the most critical events first. Such prioritization may be useful in scenarios where simultaneous events occur, and resources must be allocated in a manner that best preserves the overall network integrity and user satisfaction. Additionally, or alternatively, the management system 110 may also consider SLAs when prioritizing the of events, ensuring compliance with predetermined service standards. Adherence to SLAs may ensure that the prioritization process respects contractual obligations, maintaining a high standard of service delivery.

As shown in FIG. 1C, and by reference number 125, the management system 110 may process the prioritized events and policies associated with the private network and the public network, based on the priorities and with a second machine learning model, to determine actions to perform in the private network and the public network. For example, the management system 110 may receive or have access to the policies associated with the private network and the public network. The policies may include policies associated with the UEs 105, network overload control protection, packet detection rules, network slices, quality of service (QoS) control, SLAs, and/or the like. The management system 110 may utilize a reinforcement learning (RL) model to process, based on the priorities, the prioritized events the policies associated with the private network and the public network to determine the actions to perform in the private network and the public network. The actions may include network management techniques, such as traffic steering actions (e.g., throttling traffic, rate limiting traffic, prioritizing users, deflecting traffic, load balancing traffic, retaining traffic, and/or the like), policy-based corrective actions (e.g., updating UE policies, an overload control protection policy, packet detection rules, network slice policies, QoS control policies, SLAs, and/or the like), packet classification rule-based actions, managing user plane traffic specifically in the private network, and/or the like. Thus, the management system 110 may provide a customized network management experience that caters to the unique requirements of different network traffic types within the private network and the public network.

In some implementations, the management system 110 may process the prioritized events with alternative machine learning models, such as decision tree models, support vector machines, or ensemble learning models, which offer different approaches for analyzing the prioritized events and assisting the management system 110 in making informed decisions regarding the actions. Additionally, or alternatively, the actions determined by the management system 110 may include deploying or repositioning portable network infrastructures in response to the prioritized events. These infrastructures (e.g., mobile cell sites or temporary access points) may provide added flexibility and coverage to address localized increases in network demand or to ensure connectivity during emergency scenarios.

Figure 1D:
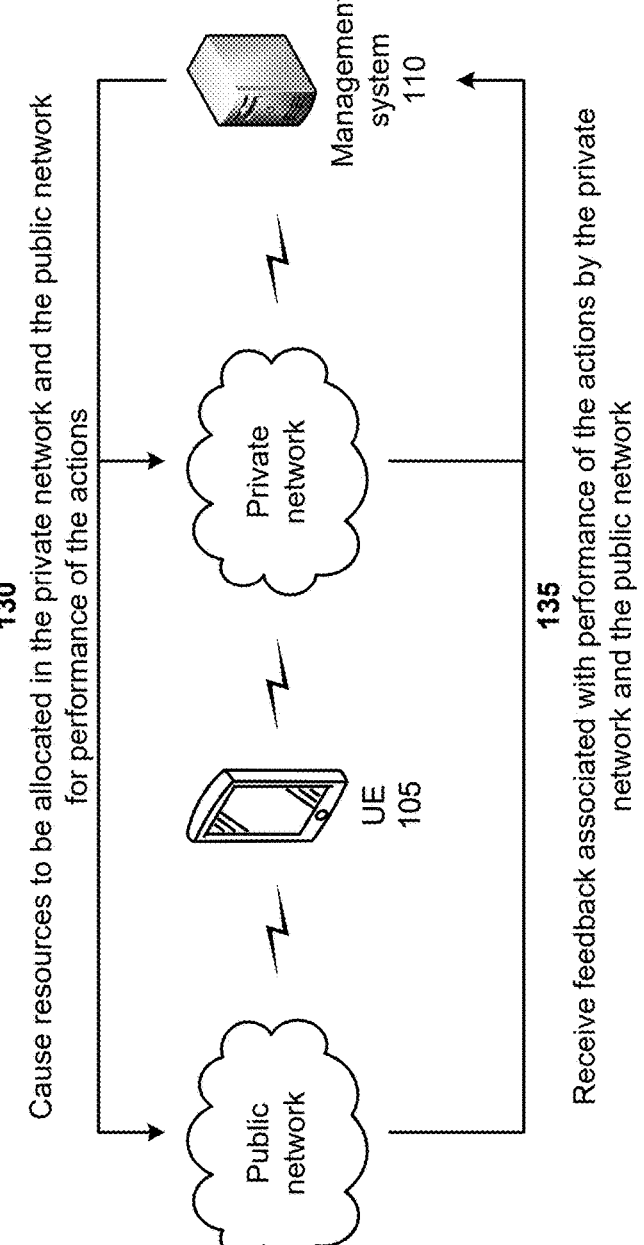

As shown in FIG. 1D, and by reference number 130, the management system 110 may cause resources to be allocated in the private network and the public network for performance of the actions. For example, the management system 110 may generate instructions indicating the actions (e.g., described above) to be performed by the allocated resources of the private network and the public network, and may provide the instructions to the allocated resources of the private network and the public network. The allocated resources of the private network and the public network may receive the instructions and may perform the actions indicated in the instructions.

In some implementations, causing the resources to be allocated in the private network and the public network for performance of the actions may include the management system 110 causing the private network and/or the public network to employ bandwidth management techniques, such as deflecting excess traffic to alternative network routes or balancing a traffic load across multiple network paths. This action may handle high traffic volumes by redirecting traffic away from congested paths or evenly distributing the traffic load to maintain consistent network performance. Additionally, or alternatively, causing resources to be allocated in the private network and the public network for performance of the actions may include the management system 110 causing the private network and/or the public network to dynamically assign network resources based on user categories. For example, public network users, public and private network users, or private network users may be allocated resources differently, depending on access privileges. Additionally, or alternatively, causing resources to be allocated in the private network and the public network for performance of the actions may include the management system 110 causing the private network and/or the public network to dynamically modify traffic steering rules or QoS parameters. For example, in response to real-time events and changing network conditions, the QoS parameters for user plane traffic may be adjusted to prioritize video streaming services during peak usage hours. Furthermore, the management system 110 may utilize predictive techniques by pre-emptively causing network resources to be allocated ahead of anticipated demand surges, drawing on historical event data to proactively manage network load.

The management system 110 may balance and optimize network resources of the private network and the public network. For example, the management system 110 may implement cross-network coordination mechanisms that synchronize resource allocation and traffic management between the private network and the public network more seamlessly, ensuring a unified approach to handling network traffic across the different networks. Additionally, or alternatively, causing resources to be allocated in the private network and the public network for performance of the actions may include the management system 110 causing the private network and/or the public network to initiate backup pathways or redundant connections to enhance network robustness during periods of high demand or network disruptions. In some implementations, causing resources to be allocated in the private network and the public network for performance of the actions may include the management system 110 causing the private network and/or the public network to deploy virtualized network functions for managing user plane traffic.

Additionally, the management system 110 may trigger alerts or notifications to network administrators upon detecting significant events, enabling human oversight and intervention if needed. Such an alert system may enable the management system 110 to preempt larger issues, and may enable network administrators to take manual corrective actions when automated systems may not suffice.

As further shown in FIG. 1D, and by reference number 135, the management system 110 may receive feedback associated with performance of the actions by the private network and the public network. For example, the management system 110 may receive feedback from the private network and the public network, such as network performance metrics (e.g., KPIs, traffic load, throughput, and/or the like) associated with the private network, network performance metrics associated with the public network, QoS metrics associated with the UEs 105, traffic patterns, service disruptions, user complaints, predictive analytics, and/or the like. Additionally, or alternatively, the management system 110 may also receive feedback from metrics associated with the UEs 105, such as application performance scores, which can shape resource management decisions to be more in line with user preferences and satisfaction levels.

The management system 110 may also receive feedback based on detecting events associated with the private network and the public network after performance of the actions by the private network and the public network. The detected events may indicate that the performance of the actions was successful (e.g., handled a traffic surge in the private network) or was unsuccessful (e.g., there is still congestion in the private network). In some implementations, the management system 110 may also cooperate with a centralized end-to-end service orchestrator to receive feedback spanning both the private network and the public networks.

Figure 1E:
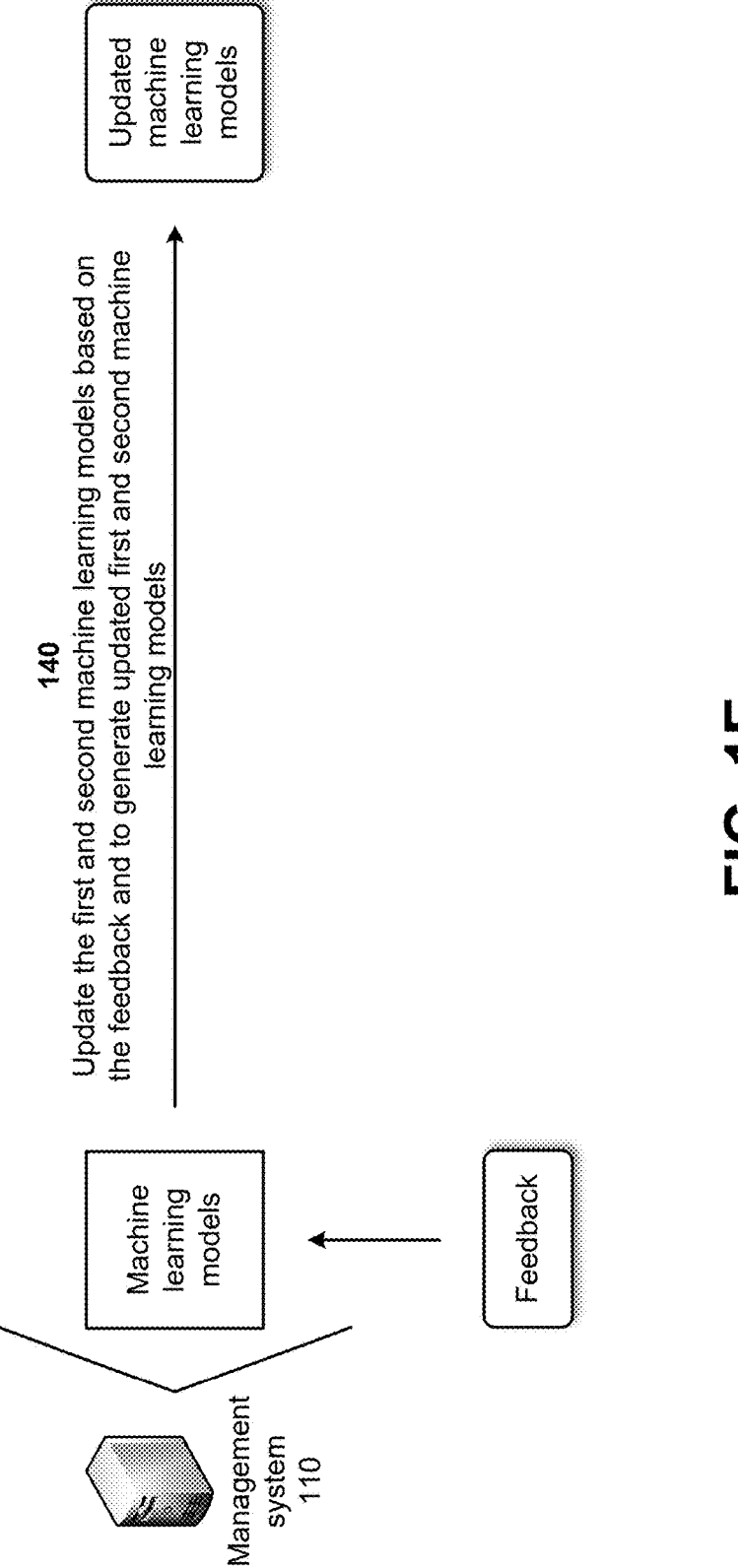

As shown in FIG. 1E, and by reference number 140, the management system 110 may update the first and second machine learning models based on the feedback and to generate updated first and second machine learning models. For example, the management system 110 may retrain the first machine learning model and the second machine learning model based on the feedback and to generate the updated first machine learning model and the updated second machine learning model. Thus, the management system 110 may utilize the feedback to refine and enhance the machine learning models responsible for event detection, event prioritization, and determination of actions within the networks. This feedback mechanism ensures a dynamic and responsive approach to network management, allowing for continuous improvement of the machine learning models based on real-world outcomes.

Additionally, or alternatively, the management system 110 may utilize various machine learning techniques, such as support vector machines, decision trees, or ensemble methods, for retraining the first and second machine learning models based on feedback. These various machine learning techniques may provide diverse approaches to analyzing and interpreting the feedback, potentially uncovering novel insights or patterns that could enhance the performance of the first and second machine learning models. Additionally, or alternatively, the management system 110 may utilize a combination of supervised, unsupervised, and reinforcement learning methods to refine the first and second machine learning models based on the feedback. Applying a combination of these learning methods can lead to more robust and versatile machine learning models. Updating the first and second machine learning models based on the feedback may ensure that operational efficiencies of the private network and the public network are maximized, user experiences are optimized, and resource utilization is effectively aligned with current demands. Furthermore, the management system 110 may utilize the feedback associated with the performance of the actions executed by the private and public networks to adjust the allocation of resources in the private network and the public network.

Figure 1F:
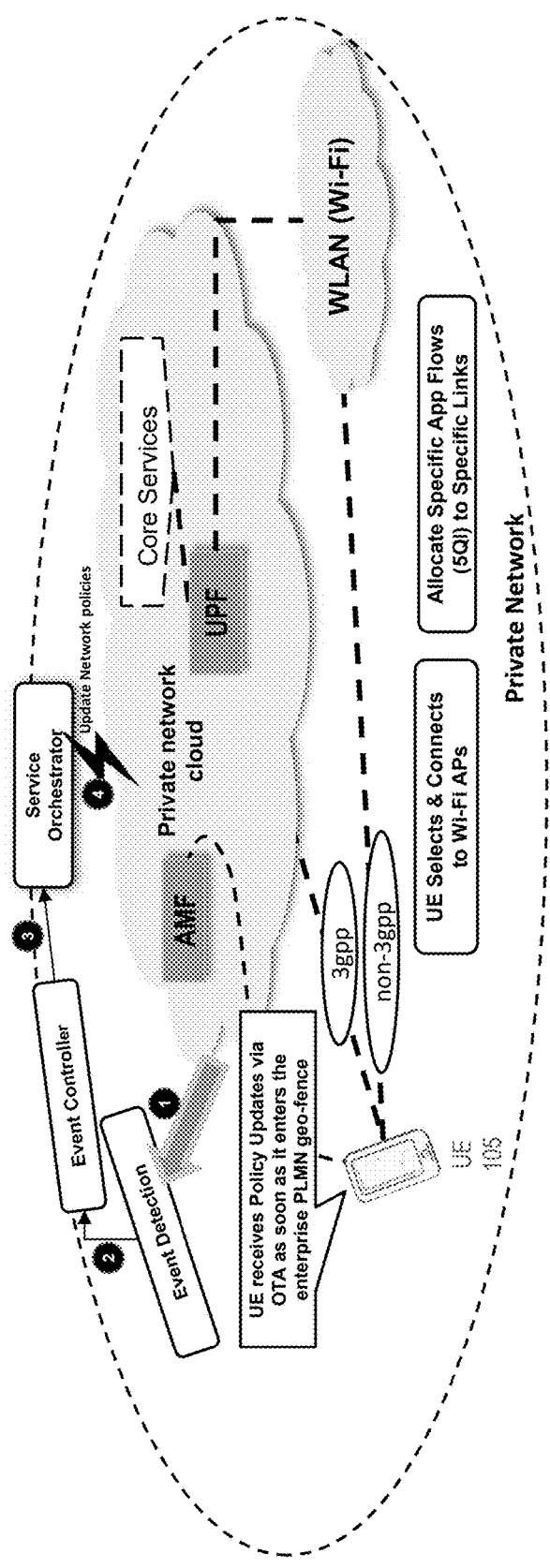

FIG. 1F depicts an example configuration of the management system 110 in relation to the private network. As shown, the event detection component, the event controller component, and the service orchestrator component may be associated with a private network cloud of the private network. The UE 105 may select and connect to Wi-Fi access points (APs) associated with a wireless local area network (WLAN) of the private network. The private network may allocate specific application (e.g., 5G QoS identifier (5QI)) flows to specific links with the UE 105. The UE 105 may receive a policy update via over-the-air (OTA) communication with the WLAN as soon as the UE 105 enters a geofence associated with the private network (e.g., an enterprise). The private cloud network may include an access and mobility management function (AMF), a user plane function (UPF), and core services. Events associated with the private network may be detected by the event detection component (e.g., step 1), and provided to the event controller component (e.g., step 2). Prioritized events may be provided from the event controller component to the service orchestrator component (e.g., step 3), and the service orchestrator component may update private network policies (e.g., step 4).

Figure 1G:
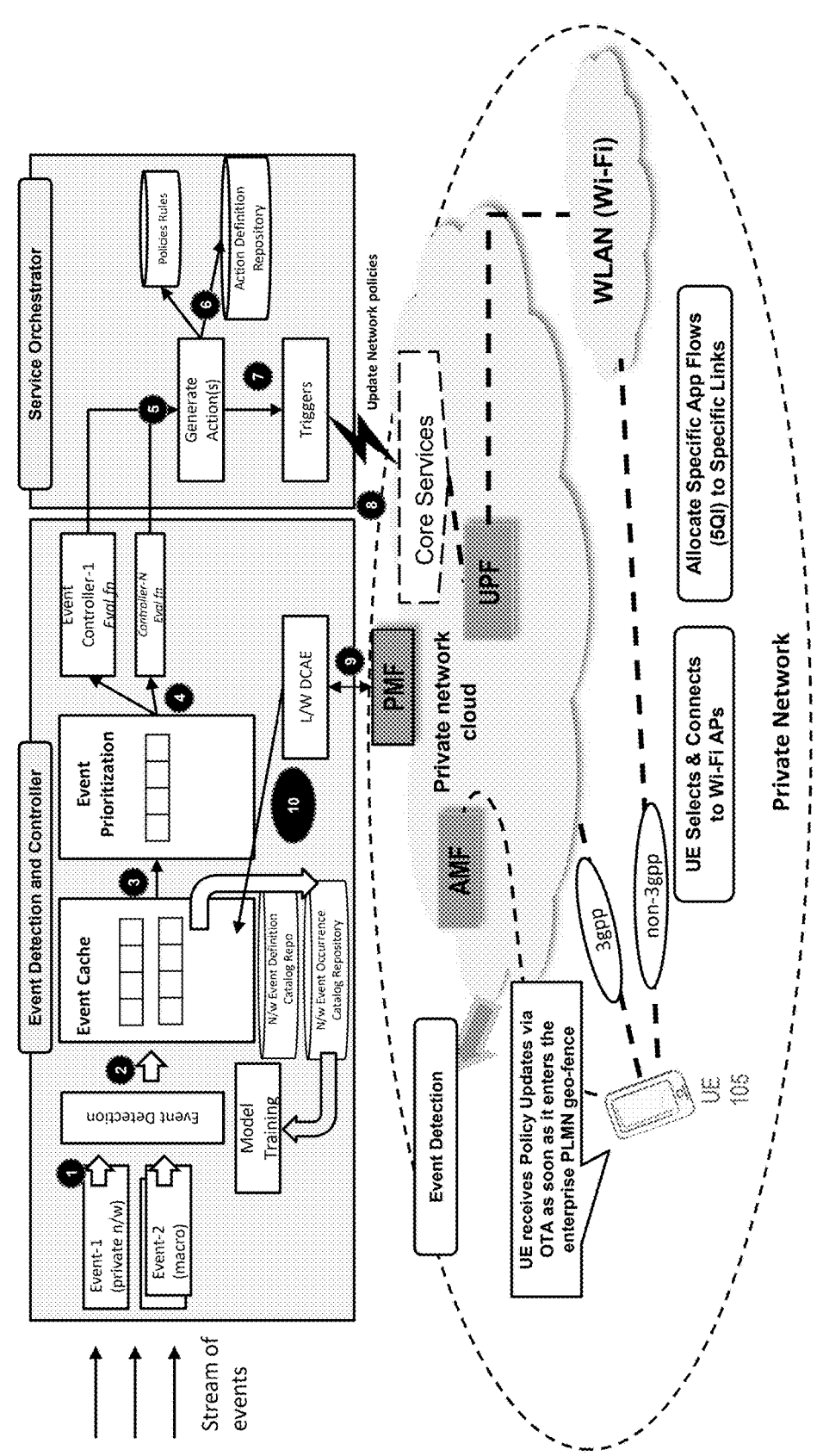

FIG. 1G depicts an example event detection and controller framework of the management system 110 in relation to the private network. The private network may include the features described in connection with FIG. 1F, but the PMF component may also be included in the private cloud network. The event detection and controller components may receive a stream of events (e.g., private network events and public network events), and may detect the events (e.g., step 1). The events may be classified and stored in an event cache (e.g., step 2), and the classified events may be provided to an event prioritization component (e.g., step 3). The event prioritization component may prioritize the classified events to generate prioritized events (e.g., step 4). The prioritized events may be provided to the service orchestrator component (e.g., step 5), and the service orchestrator may generate actions based on the prioritized events, policy rules, and action definitions (e.g., step 6). The service orchestrator component may trigger the actions (e.g., step 7), and may update private network policies based on the actions (e.g., step 8). The PMF component may receive feedback associated with performance of the actions in the private network (e.g., step 9), and may provide the feedback to the event cache (e.g., step 10) for training one or more machine learning models.

In this way, the management system 110 supports event-based demand in a private network. For example, the management system 110 may dynamically orchestrate network resources to perform actions in response to event-based demand in private network environments. The management system 110 may conserve network resources through strategic traffic steering and load balancing that dynamically adjust to real-time fluctuations in network demand, and may preserve network integrity and reduce unnecessary bandwidth consumption. The management system 110 may receive feedback associated with performance of the actions, which may facilitate continuous updating and refining of the management system 110 for an evolving network management strategy. Thus, the management system 110 may conserve computing resources, networking resources, and/or other resources that would have otherwise been consumed by failing to properly manage a diverse user mix on private networks, handling congestion in private networks due to failing to properly manage the diverse user mix, failing to rapidly scale up or down a private network infrastructure in response to fluctuations in demand while maintaining alignment with pre-existing SLAs and policies, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
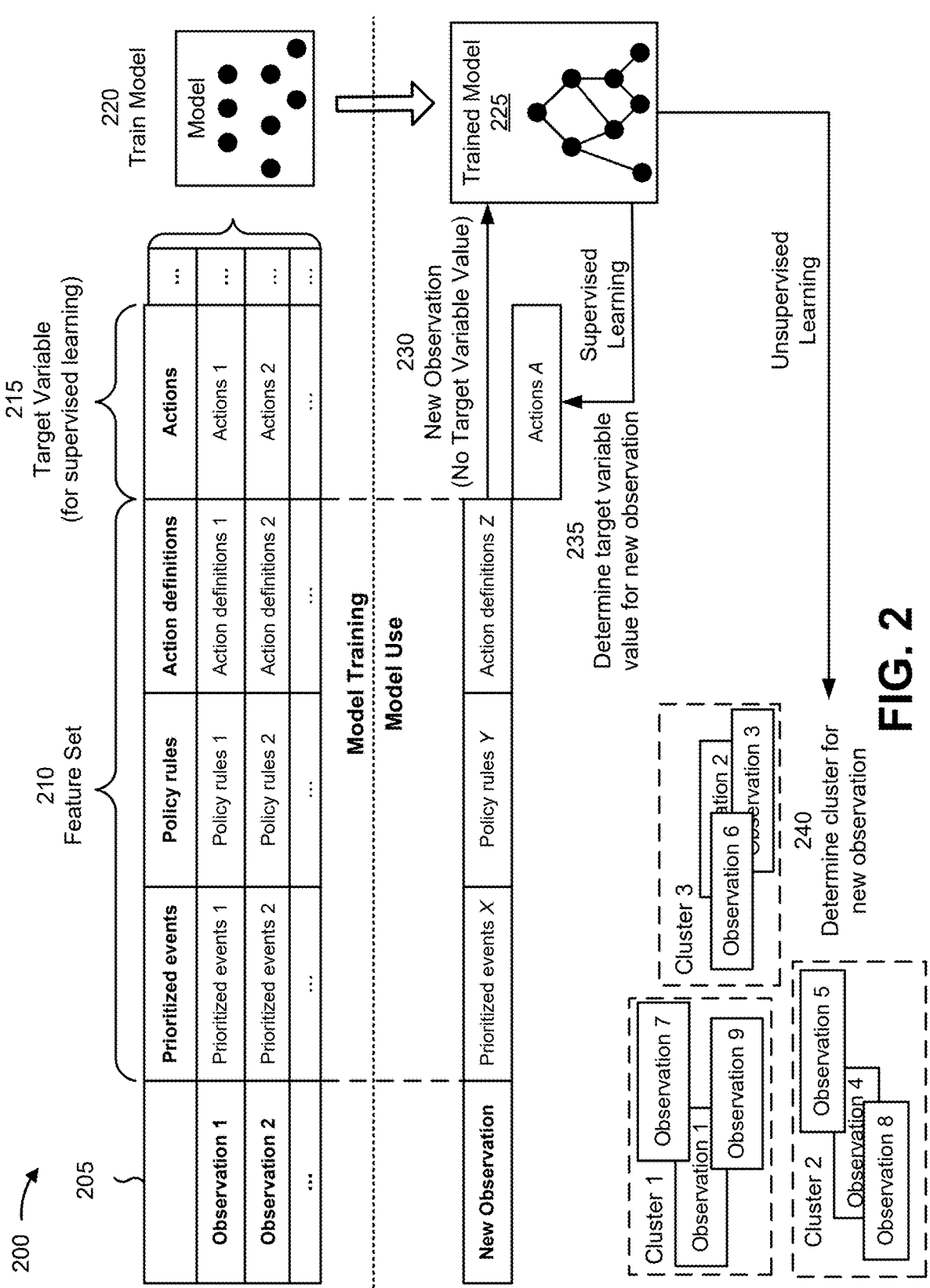
FIG. 2 is a diagram illustrating an example of training and using a machine learning model.

FIG. 2 is a diagram illustrating an example 200 of training and using a machine learning model for predicting actions based on detected network events. The machine learning model training and usage described herein may be performed using a machine learning system. The machine learning system may include or may be included in a computing device, a server, a cloud computing environment, and/or the like, such as the management system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the management system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the management system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of prioritized events, a second feature of policy rules, a third feature of action definitions, and so on. As shown, for a first observation, the first feature may have a value of prioritized events 1, the second feature may have a value of policy rules 1, the third feature may have a value of action definitions 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "actions" and may include a value of actions 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of prioritized events X, a second feature of policy rules Y, a third feature of action definitions Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of actions A for the target variable of the actions for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a prioritized events cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a policy rules cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict actions based on detected network events. The machine learning system enables recognition and/or identification of tens, hundreds, thousands, or millions of features and/or feature values for tens, hundreds, thousands, or millions of observations, thereby increasing accuracy and consistency and reducing delay associated with predicting actions based on detected network events relative to requiring computing resources to be allocated for tens, hundreds, or thousands of operators to manually predict actions based on detected network events.

As indicated above, FIG. 2 is provided as an example. Other examples may differ from what is described in connection with FIG. 2.

Figure 3:
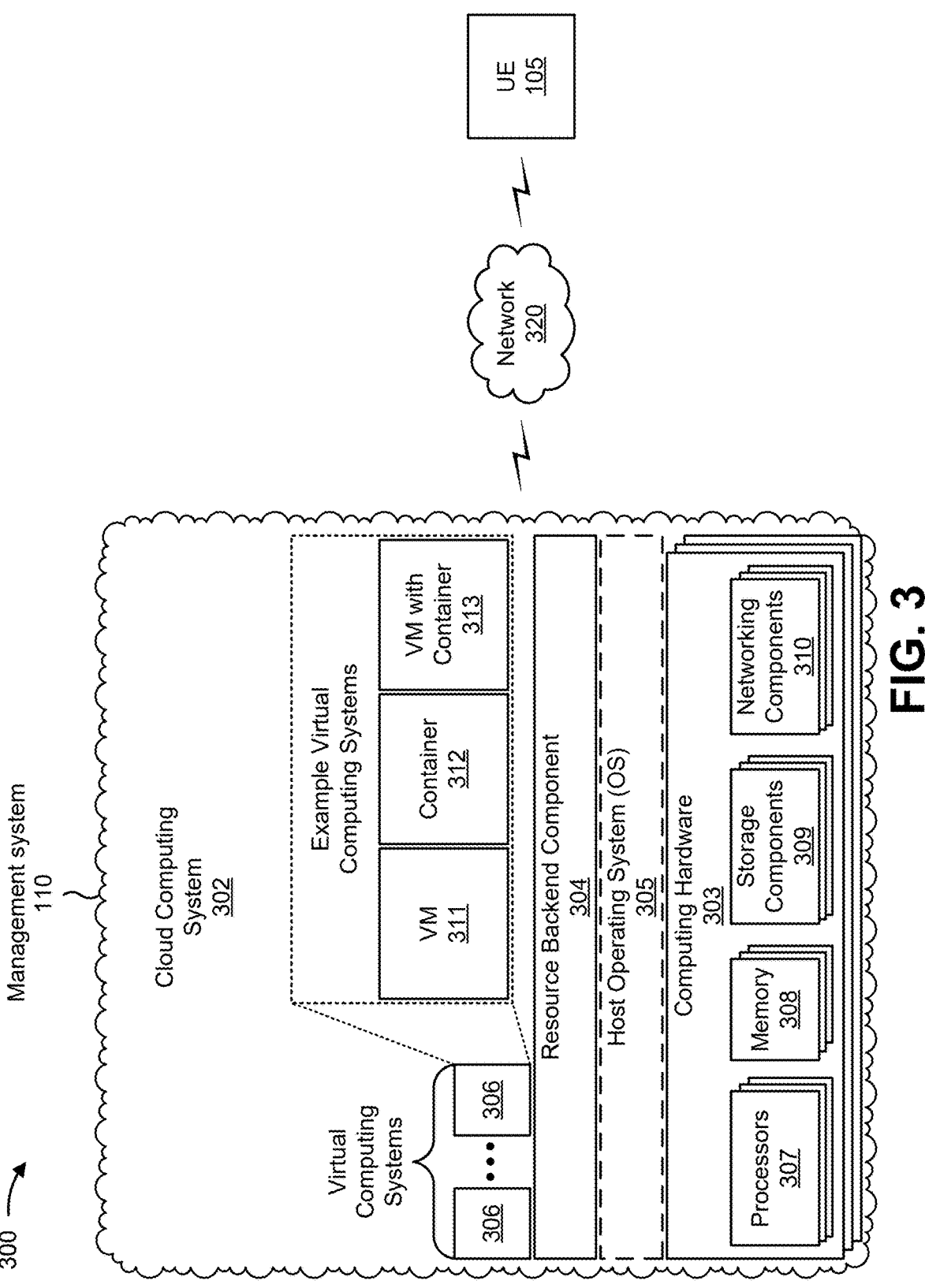
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the management system 110, which may include one or more elements of and/or may execute within a cloud computing system 302. The cloud computing system 302 may include one or more elements 303-313, as described in more detail below. As further shown in FIG. 3, the environment 300 may include the UE 105 and/or a network 320. Devices and/or elements of the environment 300 may interconnect via wired connections and/or wireless connections.

The UE 105 may include one or more devices capable of receiving, generating, storing, processing, and/or providing information, as described elsewhere herein. The UE 105 may include a communication device and/or a computing device. For example, the UE 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the management system 110 may include one or more elements 303-313 of the cloud computing system 302, may execute within the cloud computing system 302, and/or may be hosted within the cloud computing system 302, in some implementations, the management system 110 may not be cloud-based (e.g., may be implemented outside of a cloud computing system) or may be partially cloud-based. For example, the management system 110 may include one or more devices that are not part of the cloud computing system 302, such as the device 400 of FIG. 4, which may include a standalone server or another type of computing device. The management system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
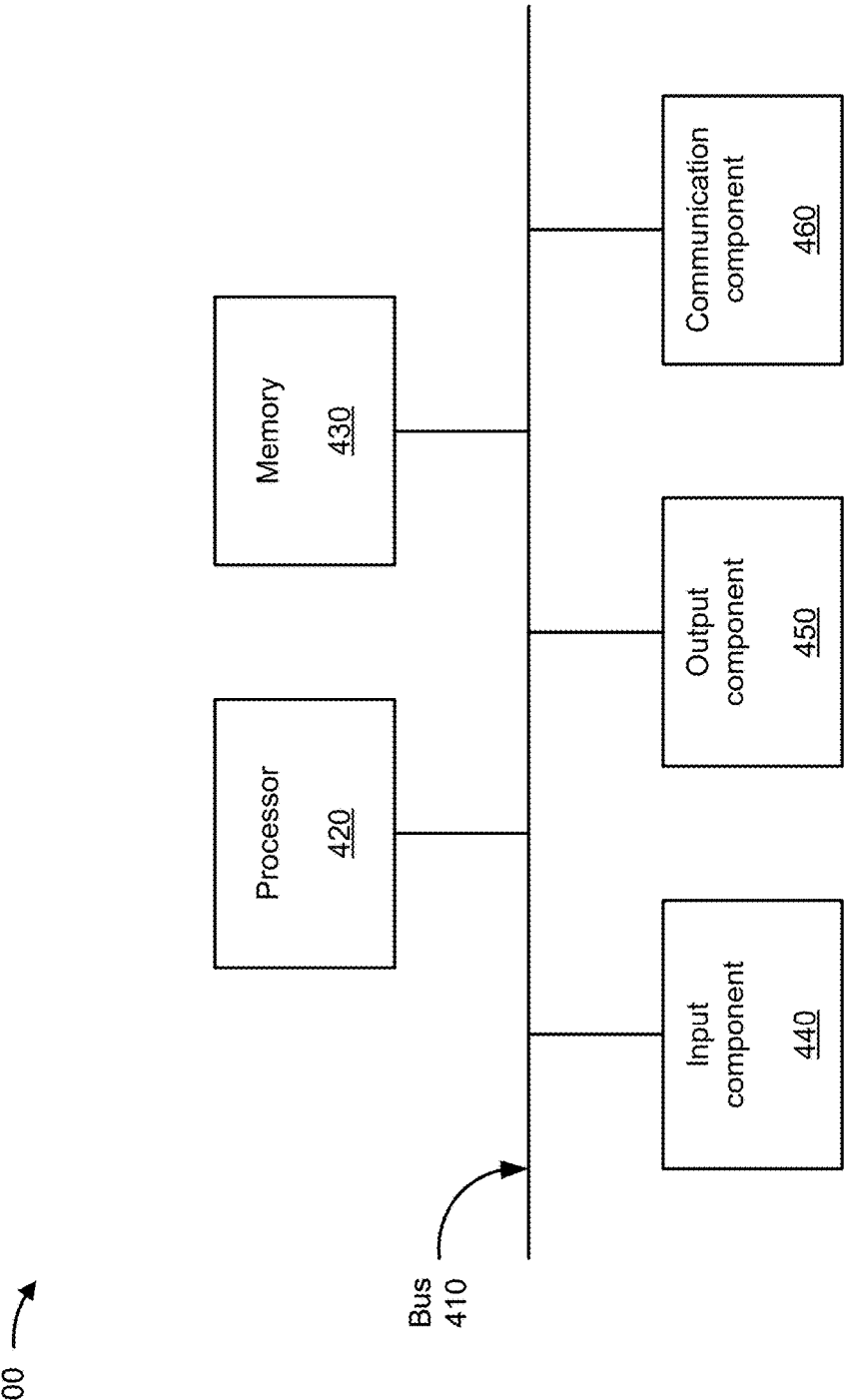
FIG. 4 is a diagram of example components of one or more devices of FIG. 3.

FIG. 4 is a diagram of example components of a device 400, which may correspond to the UE 105 and/or the management system 110. In some implementations, the UE 105 and/or the management system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications)

related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for supporting event-based demand in a private network. In some implementations, one or more process blocks of FIG. 5 may be performed by a device (e.g., the management system 110). In some implementations, one or more process blocks of FIG. 5 may be performed by another device or a group of devices separate from or including the device, such as a UE (e.g., the UE 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include detecting events associated with users of a public network and a private network (block 510). For example, the device may detect events associated with users of a public network and a private network, as described above.

As further shown in FIG. 5, process 500 may include processing the events, with a first machine learning model, to define the events and assign priorities to the events to generate prioritized events (block 520). For example, the device may process the events, with a first machine learning model, to define the events and assign priorities to the events to generate prioritized events, as described above.

As further shown in FIG. 5, process 500 may include processing the prioritized events and policies associated with the private network and the public network, based on the priorities and with a second machine learning model, to determine actions to perform in the private network and the public network (block 530). For example, the device may process the prioritized events and policies associated with the private network and the public network, based on the priorities and with a second machine learning model, to determine actions to perform in the private network and the public network, as described above. In some implementations, the actions to perform include one or more of a traffic steering action in the private network or the public network, a policy based action in the private network or the public network, a packet classification action in the private network or the public network, or an update action for a user equipment associated with one of the users. In some implementations, the actions to perform include an action to manage user plane traffic in the private network.

As further shown in FIG. 5, process 500 may include causing resources to be allocated in the private network and the public network for performance of the actions (block 540). For example, the device may cause resources to be allocated in the private network and the public network for performance of the actions, as described above. In some implementations, causing the resources to be allocated in the private network and the public network for performance of the actions includes causing the resources to be allocated in the private network to throttle traffic in the private network or to prioritize the users in the private network. In some implementations, causing the resources to be allocated in the private network and the public network for performance of the actions includes causing resources to be allocated in the private network to update a policy associated with at least one of the users.

In some implementations, causing the resources to be allocated in the private network and the public network for performance of the actions includes causing resources to be allocated in the private network and the public network to push traffic associated with a first class of the users to the private network and to push traffic associated with a second class of the users to the public network. In some implementations, causing the resources to be allocated in the private network and the public network for performance of the actions includes causing the resources to be allocated in the private network to rate limit, deflect, or load balance traffic in the private network.

In some implementations, process 500 includes receiving feedback associated with performance of the actions by the private network and the public network, and updating the first machine learning model and the second machine learning model based on the feedback and to generate an updated first machine learning model and an update second machine learning model.

In some implementations, process 500 includes determining categories for the users within the private network based on network access privileges associated with the private network, and processing the events, with the first machine learning model, to define the events and assign the priorities to the events to generate the prioritized events includes processing the events and the categories, with the first machine learning model, to define the events and assign the priorities to the events to generate the prioritized events.

In some implementations, process 500 includes receiving feedback associated with performance of the actions by the private network and the public network, and causing allocation of the resources in the private network and the public network to be adjusted based on the feedback. In some implementations, process 500 includes training the first machine learning model with historical event definitions and historical event occurrences associated with the private network. In some implementations, process 500 includes initiating a performance management function in the private network to monitor network performance metrics associated with the private network, and causing allocation of the resources in the private network to be adjusted based on the network performance metrics. In some implementations, process 500 includes training the second machine learning model with historical policy data and historical actions associated with the private network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
detecting, by a device, events associated with users of a public network and a private network;
processing, by the device, the events, with a first machine learning model, to define the events and assign priorities to the events to generate prioritized events,
wherein processing the events comprises:
categorizing the events based on different user categories associated with the public network and the private network;
processing, by the device, the prioritized events and policies associated with the private network and the public network, based on the priorities and with a second machine learning model, to determine actions to perform in the private network and the public network; and
causing, by the device, resources to be allocated in the private network and the public network for performance of the actions based on the different user categories.

2. The method of claim 1, further comprising:
receiving feedback associated with performance of the actions by the private network and the public network; and
updating the first machine learning model and the second machine learning model based on the feedback and to generate an updated first machine learning model and an update second machine learning model.

3. The method of claim 1, wherein the actions to perform include one or more of:
a traffic steering action in the private network or the public network,
a policy based action in the private network or the public network,
a packet classification action in the private network or the public network, or an update action for a user equipment associated with one of the users.

4. The method of claim 1, wherein the actions to perform include an action to manage user plane traffic in the private network.

5. The method of claim 1, further comprising:
determining the different user categories for the users within the private network based on network access privileges associated with the private network.

6. The method of claim 1, further comprising:
receiving feedback associated with performance of the actions by the private network and the public network; and
causing allocation of the resources in the private network and the public network to be adjusted based on the feedback.

7. The method of claim 1, further comprising:
training the first machine learning model with historical event definitions and historical event occurrences associated with the private network.

8. A device, comprising:
one or more processors configured to:
detect events associated with users of a public network and a private network;
process the events, with a first machine learning model, to define the events and assign priorities to the events to generate prioritized events,
wherein the one or more processors, to process the events, are to:
categorize the events based on different user categories associated with the public network and the private network;
process the prioritized events and policies associated with the private network and the public network, based on the priorities and with a second machine learning model, to determine actions to perform in the private network and the public network;
cause resources to be allocated in the private network and the public network for performance of the actions based on the different user categories;
receive feedback associated with performance of the actions by the private network and the public network; and
cause allocation of the resources in the private network and the public network to be adjusted based on the feedback.

9. The device of claim 8, wherein the one or more processors are further configured to:
initiate a performance management function in the private network to monitor network performance metrics associated with the private network; and
cause allocation of the resources in the private network to be adjusted based on the network performance metrics.

10. The device of claim 8, wherein the one or more processors, to cause the resources to be allocated in the private network and the public network for performance of the actions, are configured to:
cause the resources to be allocated in the private network to throttle traffic in the private network or to prioritize the users in the private network.

11. The device of claim 8, wherein the one or more processors, to cause the resources to be allocated in the private network and the public network for performance of the actions, are configured to:
cause resources to be allocated in the private network to update a policy associated with at least one of the users.

12. The device of claim 8, wherein the one or more processors, to cause the resources to be allocated in the private network and the public network for performance of the actions, are configured to:

cause resources to be allocated in the private network and the public network to push traffic associated with a first class of the users to the private network and to push traffic associated with a second class of the users to the public network.

13. The device of claim 8, wherein the one or more processors, to cause the resources to be allocated in the private network and the public network for performance of the actions, are configured to:

cause the resources to be allocated in the private network to rate limit, deflect, or load balance traffic in the private network.

14. The device of claim 8, wherein the one or more processors are further configured to:

train the second machine learning model with historical policy data and historical actions associated with the private network.

15. A non-transitory computer-readable medium storing a set of instructions, the set of instructions comprising:

one or more instructions that, when executed by one or more processors of a device, cause the device to:

detect events associated with users of a public network and a private network;

process the events, with a first machine learning model, to define the events and assign priorities to the events to generate prioritized events, wherein the one or more instructions, that cause the device to process the events, cause the device to:

categorize the events based on different user categories associated with the public network or the private network;

process the prioritized events and policies associated with the private network and the public network, based on the priorities and with a second machine learning model, to determine actions to perform in the private network and the public network, wherein the actions include one or more of:

a traffic steering action in the private network or the public network, a policy based action in the private network or the public network, a packet classification action in the private network or the public network, or an update action for a user equipment associated with one of the users; and cause resources to be allocated in the private network and the public network for performance of the actions based on the different user categories.

16. The non-transitory computer-readable medium of claim 15, wherein the one or more instructions further cause the device to:

receive feedback associated with performance of the actions by the private network and the public network; and update the first machine learning model and the second machine learning model based on the feedback and to generate an updated first machine learning model and an update second machine learning model.

17. The non-transitory computer-readable medium of claim 15, wherein the actions to perform include an action to manage user plane traffic in the private network.

18. The non-transitory computer-readable medium of claim 15, wherein the one or more instructions further cause the device to:

determine different user categories for the users within the private network based on network access privileges associated with the private network.

19. The non-transitory computer-readable medium of claim 15, wherein the one or more instructions further cause the device to:

initiate a performance management function in the private network to monitor network performance metrics associated with the private network; and cause allocation of the resources in the private network to be adjusted based on the network performance metrics.

20. The non-transitory computer-readable medium of claim 15, wherein the one or more instructions, that cause the device to cause the resources to be allocated in the private network and the public network for performance of the actions, cause the device to:

cause the resources to be allocated in the private network to throttle traffic in the private network or to prioritize the users in the private network.

\* \* \* \* \*